No. 780,948. PATENTED JAN. 24, 1905.
J. H. HALES.
OPTICIAN'S FRAME GAGE.
APPLICATION FILED MAR. 17, 1904.

Witnesses
Chas. T. Davis
M. E. Moore

Inventor
John Harris Hales
by Wm. V. Moore
Attorney

No. 780,948. Patented January 24, 1905.

UNITED STATES PATENT OFFICE.

JOHN HARRIS HALES, OF NEWPORT NEWS, VIRGINIA.

OPTICIAN'S FRAME-GAGE.

SPECIFICATION forming part of Letters Patent No. 780,948, dated January 24, 1905.

Application filed March 17, 1904. Serial No. 198,573.

*To all whom it may concern:*

Be it known that I, JOHN HARRIS HALES, a citizen of the United States, residing at Newport News, in the county of Warwick and State of Virginia, have invented certain new and useful Improvements in Opticians' Frame-Gages, of which the following is a specification.

My invention relates to improvements in opticians' frame-gages; and it consists of certain features of novelty and combinations and arrangements of parts, as will be hereinafter pointed out and claimed.

In the measurement of the features of a person for the fitting of frames for nose-glasses or for spectacles it is necessary to determine the pupilary distance or the distance between the pupils of the eyes, the vertical distance between the bridge of the nose and the pupils of the eyes, the position of the crest of the nose with reference to the eyelashes, the width of the base of the bridge of the nose, the temple length or distance from the lenses to the ear, the temple width or the horizontal distance between outsides of temples, and the angle between the nose-line and the desired position of the lenses. Some of the means at present used to determine these various measurements consist either of a series of templets, (usually bound into a sheaf,) each templet having one function only and being capable of permitting a very limited number of readings, with no means of interpolation, or else a cumbersome metal apparatus with numerous adjusting-screws and complicated parts. It is for the purpose of permitting wide range in measurements and at the same time securing accuracy without the introduction of a complication of parts that I have devised my gage, which by an arrangement of parts hereinafter described accomplishes all of the above-named functions in a simple and effective manner.

I have illustrated my invention in the accompanying drawings, which form part of this specification, and in which—

Figure 1:
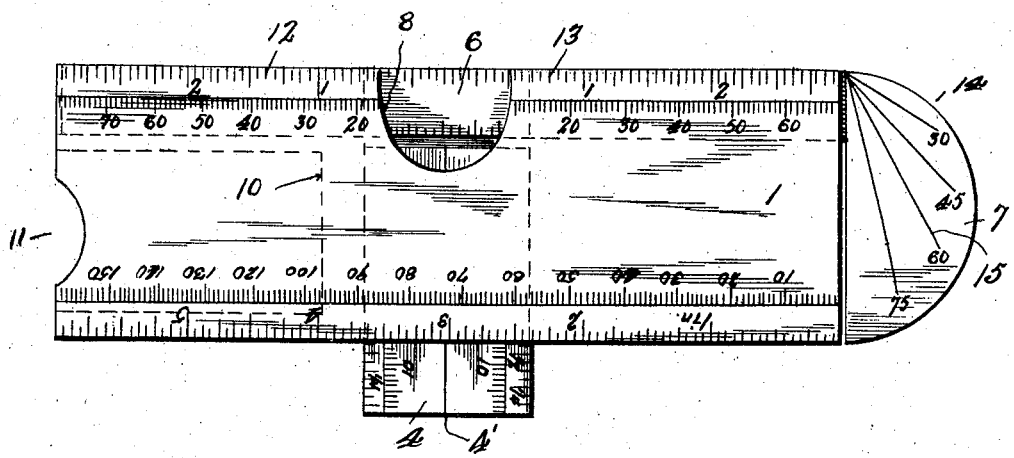
Figure 2:
Figure 3:
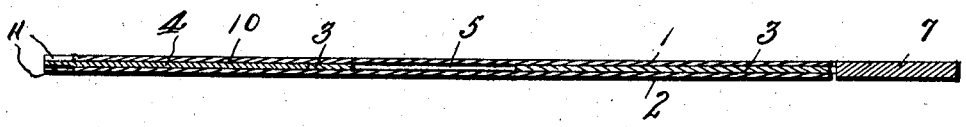
Figure 4:
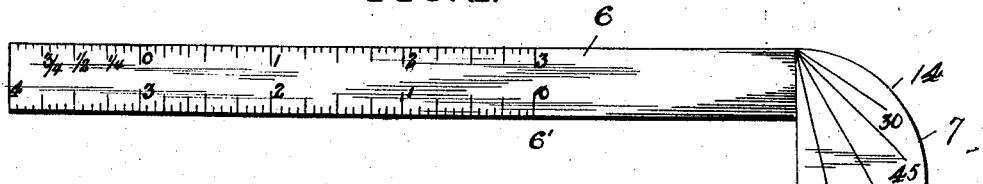
Figure 5:
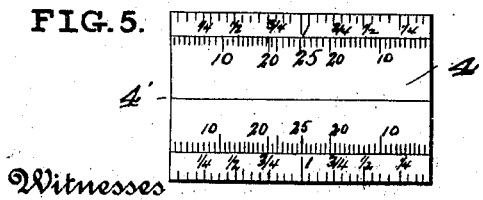

Figure 1 represents a side view of the measuring-gage as a whole. Fig. 2 represents an edge view of the body of the gage. Fig. 3 shows a longitudinal section through the gage, the measuring-square and sliding gage being shown in stowed position. Fig. 4 is a plan view of the measuring-square, and Fig. 5 represents the sliding measure and illustrates the system of scales used thereon.

As shown in the figures, the gage consists of the body or gage proper, which is itself composed of the side pieces 1 and 2 and the filling-pieces 3, the whole being preferably made of celluloid or other suitable material and cemented together, and the sliding measure 4, which is capable of being slid between the side pieces 1 and 2 and is adapted to be inserted in opening 5 and is bounded and retained by the edges of the filling-pieces 3. The measuring-square consists of the blade 6 and the head 7, the blade being of the same thickness as the filling-piece 3, and thus being capable of being stowed between the edges of the side pieces, and the head being of a thickness equal, preferably, to that of the body of the gage. The body of the gage is further provided with the recess 8, the pocket 10 for stowing the sliding measure when not in use, and the thumb-hole 11, which is provided to permit the withdrawal of the sliding measure 4 from its stowage position. The scales and markings shown on the various parts will be described hereinafter in dealing with the functions of these parts.

The first function is the determination of the pupilary distance or distance between the pupils of the eyes in their normal positions. This is accomplished by removing the measuring-square 6 and holding the gage vertically over the bridge of the nose with scales 12 and 13 on a level with the pupils and the center line 4' on the sliding measure 4 over the center of the bridge of the nose. The distance from the center of the bridge of the nose to the center of each pupil may then be read off directly on the said scales. This method has the advantage of detecting non-symmetry of the eyes, which is of great importance in the making of frames.

The second function is the determination of the height of the bridge of the nose above or below the normal center of the pupils. This is accomplished by holding the gage with recess 8 vertically over the bridge of the nose with the end of the sliding measure 4 in contact with the bridge of the nose, the center line 4' of measure and of the bridge coinciding, and raising or lowering the body of the gage until the lower edge is in line with the centers of the pupils. The recess 8 permits the lowering of the gage sufficiently to accommodate the highest bridge. In case of a low bridge the sliding measure 4 will project beyond the lower edge of the gage and the reading on the sliding measure will be made on that side of the gage. In the case of a high bridge the sliding measure will recede into the recess 8 and the reading on the measure will be made on the opposite edge of the gage. In either case the reading on the sliding measure is the distance between the bridge of the nose and the center of the pupils of the eyes measured vertically.

The third function is the determination of the crest of the nose with reference to the tips of the eyelashes. This is accomplished by holding the gage horizontally with the same end of the sliding measure 4 as was used in the last determination in contact with the crest of the nose, the body of the gage being advanced or withdrawn until the edge of the gage just clears the lashes. The readings will be read in the same manner as in the last determination by means of the scales on the sliding measure.

The fourth function is the determination of the width of the bridge of the nose at its base. This is accomplished by placing the edge of the recess situated farthest from the head of the measuring-square against the side of the nose at the base of the bridge (the blade of the square having been first withdrawn from its stowed position) and then bringing the tail end of the blade of the square against the other side of the nose. The width of the recess 8 is in practice one inch at its widest part, and the scale on the blade 6 of the square is so arranged that the width of the base of the nose may be read off direct by this means, as will be seen by referring to Fig. 4.

The fifth function is the determination of the temple length and width. This is accomplished by placing the gage as in the measurement of the position of the crest, the head of the measuring-square being set against the back or unrecessed edge of the body of the gage, so that the blade 6 is at right angles to the body and extends past the temples to the ear. The scales on the inner edges of the blade (there being scales on both sides thereof) begin at a point 6' distant from the head of the square a space equal to the width of the body, so that the temple length or distance from the recessed edge of the gage-body to the top of the ear is read off direct on the scale just referred to. By placing the square first against one temple and then against the other and adding the distances intercepted on scales 12 and 13 by the inner edge of the blade of the square the temple width or distance between planes tangent to the temples and parallel to each other is determined.

The sixth function is the determination of the angle of the tilt of the lenses with reference to the line of the nose. This is accomplished by means of the measuring-square alone, the edge 14 of the head 7 of the square being fitted into the hollow between the nose and forehead (the blade of the square being in a vertical plane) and the square being rotated in a vertical plane until the edge of the blade is parallel to the desired position of the lenses. That one of the lines 15 which is then parallel to the line of the ridge of the nose determines the angle between nose and lenses. As shown, the lines are at intervals of fifteen degrees; but they may be arranged at any suitable smaller intervals, the principle holding good no matter what the angular division.

It will be noted that I have arranged some of the scales in both inches and millimeters, as both systems are in use and many opticians prefer to use the metric system of measurements. It is evident that any system of division may be employed to suit the trade for which it is designed.

The spaces unoccupied on the sides of the gage-body are reserved for the usual ellipses for the purpose of comparing and measuring the sizes of the lenses or for other similar diagrams or for convenient tables, or I may devote portions of said space to the display of advertisements. I intend, moreover, to provide a case to facilitate the safe carrying of the gage, which case will be made, preferably, of celluloid and whose surfaces may be devoted to any or all of the purposes named in regard to the unoccupied space on the sides of the body of the gage.

While I have specified certain materials of construction and have illustrated my invention in a certain definite way as regards dimensions or proportions, &c., still I reserve the right to modify materials, dimensions, or proportions and minor details to suit my convenience, and while I am aware that gages have been used for the purpose for which my invention is designed I believe that I have combined more features in my invention than exist in any other and in a much simpler way. Therefore I do not claim, broadly, an optician's gage; but What I do claim, and desire to secure by Letters Patent, is—

1. An optician's frame-gage having suitable calculating means or scales thereon, means for adapting the gage to the features, and a sliding piece movable in said gage having a centering-line thereon.

2. An optician's frame-gage, having a scale thereon and provided with a recess, and a sliding piece movable in said gage provided with a centering-line and adapted to be extended in line with the center of said recess.

3. An optician's frame-gage, having a scale thereon and provided with a recess for adapting the gage to the features and provided with an opening arranged transversely to the scale, a sliding piece having a centering-line movable in said opening and said gage being formed with a pocket for the storage of said sliding piece.

4. An optician's frame-gage, having a scale thereon, an adjustable member for centering the gage between the pupils of the eyes, said gage being provided with a recess for adapting the gage to the features.

5. An optician's frame-gage, having suitable scales thereon and provided with a recess for adapting the gage to the features, said gage being further provided with a pocket, a centering-piece adapted to fit in said pocket, and a measuring-square adapted to fit in said recess of the gage.

6. An optician's frame-gage, means for adapting said gage to the features, and an adjustable member having suitable scales thereon for use in connection with the means for adapting the gage to the features.

7. An optician's frame-gage, having a recess therein for adapting the gage to the features, and an adjustable member having suitable scales thereon for use in connection with the edges of said recess for measuring certain of the features.

8. An optician's frame-gage, having a recess therein for adapting the gage to the features, a longitudinal slot in the gage and a measuring-square extensibly located therein for use in measuring distances from the edge of the recess.

9. An optician's frame-gage, means for adapting said gage to the features, and an adjustable measuring-square having a suitable scale thereon and provided with a rounded head.

10. A gage, means for adapting the gage to the features, a centering-piece, and a measuring-square, combined for use in ascertaining the measurements for spectacle-frames.

11. A gage, having a recess therein for adapting the gage to the features, a sliding measure having a centering-line thereon, and a measuring-square having a blade and rounded head and suitable calculating-scales thereon, combined for use in ascertaining the measurements for spectacle-frames.

12. A measuring-square consisting of a blade, having scales thereon, and a rounded head provided with radiating lines spaced at predetermined intervals.

13. An optician's frame-gage, having an opening to fit upon the nose and formed with a vertical and a longitudinal recess or pocket, a vertical scale fitting in said vertical pocket and a longitudinal measure fitting in the horizontal pocket and carrying a head at one end provided with calculating-scale.

14. An optician's frame-gage, provided with upper and lower scales, a vertical centering-scale, a longitudinal movable scale having a head provided with a calculating-scale.

15. An optician's frame-gage, consisting of the rectangular piece provided with an upper and lower scale, with a vertical and longitudinal pocket and with means to adapt said piece to the features, a vertical centering-piece fitting in the vertical pocket and a longitudinal scale fitting in the longitudinal pocket and having a calculating portion on one end.

In testimony whereof I have signed my name to this specification in presence of two witnesses.

JOHN HARRIS HALES.

Witnesses:
GODFREY L. SMITH,
J. B. SPRAGUE.